Jan. 28, 1947.　　　D. McDONALD　　　2,415,018
MOTOR VEHICLE JACK
Filed Nov. 5, 1945
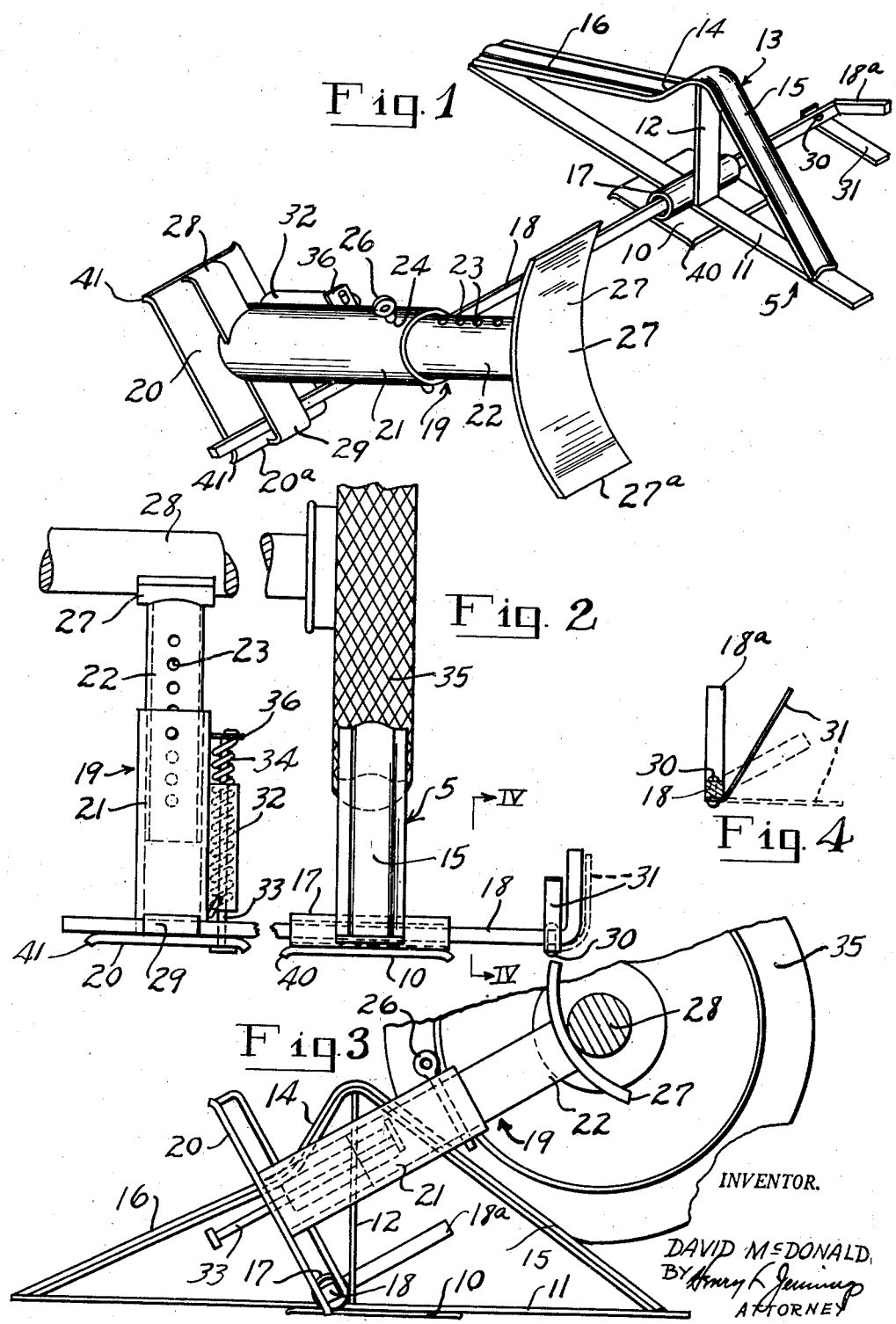
INVENTOR.
DAVID McDONALD,
BY Henry L. Jennings
ATTORNEY Patented Jan. 28, 1947

2,415,018

UNITED STATES PATENT OFFICE 2,415,018

MOTOR VEHICLE JACK

David McDonald, Birmingham, Ala.

Application November 5, 1945, Serial No. 626,756

4 Claims. (Cl. 254—94)

This invention relates to a lifting device for motor vehicles of the kind embodying a ramp up which a wheel of the vehicle is run, together with a support to which the load of the vehicle is transferred as the wheel approaches the top of the ramp, and has for an object the provision of a device of the character designated which shall be sturdy, yet light of construction, easily placed in position to raise the vehicle, and one which, when the vehicle is lowered from the support moves the support out of the way.

In my previously filed application, Serial No. 589,848, filed April 23, 1945, I have shown, described and claimed a vehicle jack of the general character herein disclosed, including a wheel support hingedly connected to a ramp and adapted to move from an inclined to a vertical vehicle supporting position when engaged by a vehicle in motion. While the device therein disclosed has proven eminently satisfactory in operation, I have found that the ramp may better be comprised of parts permanently joined together and as so constructed, include means for moving it out of the way of the support, once the vehicle is raised. My present invention also includes a hinge pin embodying means permitting the wheel support to be inclined at the proper angle for receiving a convenient part of the vehicle to raise it. My present invention further includes improved means for turning the vehicle support over on its side as soon as the weight is removed therefrom. These and other features of my invention are illustrated in the accompanying drawing, forming a part of this application, in which Fig. 1 is a perspective view showing the jack in position to receive a motor vehicle;

Fig. 2 is an elevational view with parts broken away showing the position of the ramp and the axle after the vehicle has been raised;

Fig. 3 is a sectional elevation showing the device during the raising of the vehicle and at the instant when the saddle of the support engages the axle; and Fig. 4 is a detail sectional view showing the means provided for tilting the wheel support at the proper angle for engaging the axle.

Referring now to the drawing for a better understanding of my invention, I show a ramp 5 comprised of a base 10, a longitudinal member 11 welded to the base, a vertical support 12 and an inclined member 13 joined to the longitudinal member 11 and vertical member 12. The inclined member 13 is provided on one side with a steeply inclined portion 15 extending from the longitudinal member 11 to the top of the vertical member 12, thence dropping off suddenly on the other side along an abrupt incline 14, followed by a portion 16, joined to the other end of the longitudinal member 11, and inclined at a lesser angle than the portion 15. This provided a hump, as shown, at the top of the inclined portion 15. A cylindrical sleeve 17 is welded to the base 10 and is adapted to receive a hinge pin 18, the latter being free to turn therein.

The axle support 19 comprises a base member 20 on which are mounted telescoping, relatively movable cylindrical sections 21 and 22. The section 22 is provided with a plurality of holes 23 and the section 21 is provided with a hole 24 to receive an adjusting pin 26 which passes through the hole 24 into a selected hole 23 to adjust the height of the support. On the upper end of the cylindrical member 22 is a saddle 27 which is adapted to receive a suitable part of a vehicle, such as the axle 28 of a wheel 35, when the same is being raised as shown in Fig. 3 of the drawing. Welded to the base 20, on opposite sides of the section 21 are straps 28 and 29 which form, with the base 20, elongated slots for receiving the hinge pin 18. As may be seen in Figs. 3 and 4, the hinge pin 18 is rectangular in cross section and of a dimension to fit snugly between the straps and the base. On the outer end of the hinge pin 18 is pivotally mounted a short, soft iron strap 31 which may be bent to set the the hinge pin 18 at an angle which will hold the support at the proper height for the saddle 27 to engage the axle 28 or such other part of the vehicle as may be convenient to raise it. The strap 31 is made of soft iron so that it may be adapted to the particular vehicle with which the jack is associated and once set at the proper angle for that vehicle will require no further adjustment. When the device is not in use, the strap 31 may be pivoted about the rivet 30 to lie in the same plane as the handle 18a of pin 18, thus preventing accidental bending of the strap.

Mounted on the side of the section 21 is a sleeve 32 in which is inserted a trip pin 33 which is surrounded by a spring 34 and which extends downwardly through a suitable opening in the base 20. The spring 34 engages the head 36 of the trip pin and the lower end of the sleeve, whereby the trip pin is biased downwardly at all times.

In operation, the parts of my improved vehicle jack are assembled in the position shown in Fig. 1 of the drawing except that the axle support 19 is placed with the lower edge 27a of the saddle and edge 20a of the plate 20 resting on the ground. The handle 18a of the pin 18 is now turned upwardly raising the support 19 and the strap 31 is pivoted from around the end of the handle 18a as shown in dotted lines in Fig. 2, to the position shown in full lines throughout the drawing. In that position, the strap 31 is bent to hold the saddle 27, as shown in Fig. 3, to receive the axle, or some other part of the vehicle, as the vehicle wheel 35 is run up the inclined section 15 of the ramp. The vehicle in motion engages the saddle of the support and as the wheel approaches the top of the ramp the weight is transferred from the ramp to the support, the support moving ahead of the peak of the ramp when the vehicle is in its raised position. In order to prevent the ramp and support from slipping when engaged by the vehicle, the edges of the bases 10 and 20 are turned down at 40 and 41 to grip the ground, as shown in the drawing. As the vehicle passes the peak of the ramp and the weight is transferred to the support, if a driven wheel is being raised, the wheel is still turning, and, being in engagement with the relatively steep portion 14, will kick the ramp out of the way. The elongated slot formed by the straps 28 and 29 permits the hinge pin 18 to swing about with the ramp. Once the vehicle is raised, the pin 18 and the ramp 5 are removed. When the necessary repairs have been made, the ramp is placed under the wheel, with inclined portion 16 in engagement therewith, and the wheel is run up the ramp to transfer the weight of the vehicle from the support to the ramp and then to the ground. It will be noted that it is not necessary to run the wheel over the highest or humped portion of the ramp but that the weight is removed from the support 19 after only a short run up the inclined portion 16 of the ramp. As soon as the weight has been taken away from the support, the trip pin 33 acts to turn the support over on its side out of the way of other parts of the vehicle.

From the foregoing it will be apparent that I have devised an improved vehicle jack which is simple of design and operation and by means of which a vehicle may be raised and lowered easily, without the exercise of manual labor.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A lifting device for a vehicle having a wheel, comprising a ramp up which the wheel may be driven, a support hingedly connected at its lower end to the ramp and adapted to move from an inclined to a vertical supporting position when engaged by the vehicle in motion, a hinge pin angular in cross section for hinging the ramp to the support, a base on the support having an elongated slot in which the hinge pin fits, and adjustable means for setting the hinge pin at the required angle to hold the support in position to engage a convenient part of the vehicle to raise it.

2. A lifting device for a vehicle having a wheel, comprising a ramp up which the wheel may be driven, an adjustable support adapted to move from an inclined to a vertical vehicle supporting position when engaged by a part of the vehicle in motion, a base for the support having an elongated slot therein, a hinge pin angular in cross section fitting in the slot and hingedly connecting the support at its lower end to the ramp, the hinge pin being free to turn with respect to the ramp, and means for adjusting the hinge pin at the required angle to hold the support in position to engage a part of the vehicle to be raised.

3. A lifting device as set forth in claim 2 in which the ramp comprises a base, a member for engaging the wheels of the vehicle secured to and having a portion inclined to the base and extending upwardly to a peak, thence downwardly at an abrupt angle to provide a hump in the ramp, thence downwardly to the base at a decreased angle of inclination.

4. In a vehicle lifting device of the character described, an adjustable support comprised of telescoping members, a base on the support, a strap secured to the base and defining therewith an elongated slot, a ramp for engaging and raising the wheel of a vehicle in motion, a sleeve on the ramp, a rod angular in cross section extending through the sleeve and engaging the sides of the slot on the base, and an adjustable member pivoted to the rod to hold the support in an inclined position for engaging a part of the vehicle in motion.

DAVID McDONALD.